United States Patent [19]
Gjoerloff

[11] 3,784,036
[45] Jan. 8, 1974

[54] TOW TRAILER FOR VEHICLE
[75] Inventor: H. Eric Gjoerloff, Gern Park, Fla.
[73] Assignee: Redy-Tow, Inc., Evanston, Ill.
[22] Filed: Aug. 17, 1972
[21] Appl. No.: 281,329

[52] U.S. Cl............................. 214/86 A, 254/139.1
[51] Int. Cl.............................................. B60p 3/12
[58] Field of Search................... 214/86 A; 280/402; 254/139.1

[56] References Cited
UNITED STATES PATENTS
3,703,240  11/1972  Russell............................... 214/86 A
3,721,356  3/1973   McNeill.............................. 214/86 A

*Primary Examiner*—Albert J. Makay
*Attorney*—Alfred E. Wilson

[57] ABSTRACT

A self contained independent two trailer unit comprised generally of a horizontally disposed V frame, having a forwardly extending tongue, providing a trailer hitch at its forward end, and a transverse axle, extending across the distal ends of the V, carrying a pair of support wheels. A vertical beam is fixed to and extends upwardly from the apex of the V and houses a hydraulic cylinder which is operable by a hydraulic pump means, carried on the frame, to actuate a pair of lift arms to elevate one end of a vehicle by means of chains fixed relative to a clevis bar carried by the lift arms.

15 Claims, 3 Drawing Figures

TOW TRAILER FOR VEHICLE

STATE OF THE PRIOR ART

U.S. Pat. No. 3,559,827 to Francis E. Schier discloses an automotive towing unit having a frame carrying wheels spaced laterally apart further than the wheels of a conventional motor vehicle to be towed. The Schier patent employs a reversible electric motor drivingly connected to a windlass through reduction gearing to vertically elevate one end of a vehicle.

U.S. Pat. No. 3,522,892 to T.S. Vegors discloses a trailer for towing road vehicles which utilized a single pivotal lift arm connected at one of its ends to the frame unit upwardly of an upright frame structure. The front end of a vehicle is fixed by chain means to a transverse bar carried by the swinging end of the lift arm and is elevated by a hydraulic pump operated cylinder and piston connected directly between the frame and the lift arm.

U.S. Pat. No. 2,808,160 to P.T. LaLonde discloses a vehicle hoisting and towing dolly employing a hand operated winch for generally vertically elevating one end of a vehicle by drawing a cable upwardly and over a pulley, mounted on top of a vertical post.

U.S. Pat. No. 3,152,704 to A.E. Russell discloses a vehicle towing device which is very similar to the P.T. LaLonde structure except that the vehicle is elevated along an inclined ramp instead of simply being raised vertically.

U.S. Pat. No. 2,553,229 to A.F. Barhorst discloses a portable derrick which also utilizes a winch means to generally vertically elevate one end of a vehicle but also includes adjustable spacer bars to maintain a predetermined spacing between the towing device and the vehicle.

U.S. Pat. No. 2,937,772 to G.O. Sullivan discloses a dolly for towing disabled vehicles employing a pivotal lift frame for swinging one end of a vehicle upwardly and forwardly to a raised position. The lift frame is actuated by a winch means that may be operated either manually or automatically by an electric motor, a rather complicated series of pulleys and drive belts being employed to transmit the forces to the lift frame by means of a cable.

BACKGROUND OF THE PRESENT INVENTION

With our constantly improving road system and rapidly increasing traffic situations there is a relative increase in the number of garages, repair and service stations and the like, many of which offer a 24 hour service with a mechanic on duty.

It can be readily appreciated, however, that some form of towing equipment is the connecting link between the public in need of road service and the service station equipped with regular repair service. Many service stations have forced themselves out of business by overextending themselves by the purchase of large, expensive, more than adequate wrecker equipment.

Because of this, there is a tremendous need for an inexpensive, easy to operate towing unit which is well within the means of a small service station and yet is strong enough to meet the requirements of a large automobile agency.

The tow trailer of the present invention is designed to hoist either the front or rear end of a car or truck to enable it to be towed to a garage in a wrecker type manner, utilizing the services of one man to do the entire job of lifting the vehicle and then towing it.

One of the principal objects of this invention is to provide a hydraulically operated mechanical means to hoist and tow a disabled vehicle.

A further object of the present invention is to provide a tow unit wherein most of the weight of the towed vehicle is carried by the tow unit itself without transferring a substantial portion of the load to the towing vehicle, however, adjustment means are provided to shift a desirable amount of the weight to the towing vehicle's trailer hitch for better control. Most of the weight of the leading end of the towed vehicle is, therefore, carried by the tow trailer just forwardly of the axis of the axle thereof. Most of the weight of the disabled vehicle is imposed on the tow unit's wheels. Because of this, when the brakes of the towing vehicle are applied, the forward thrust of the towed vehicle tends to move the tow unit forward about the axle and applies a downward thrust to the rear end of the towing vehicle.

Another object of this invention is to provide a hinged lift arm frame and clevice bar assembly together with means pivotally mounted on the clevice bar end of the lift arm frame for engaging the leading end of the towed vehicle by means of a hydraulically actuated lifting cable. The lift arm frame swings from a rearwardly extending lower position in a horizontal plane adjacent to the plane of the main tow unit frame to a forward, elevated position, thereby positioning the engaged vehicle in the desired upper towing position.

Yet another object of the present invention is to provide a towing unit as above set forth wherein a pair of supporting chains are detachably, adjustably connectable to the opposed ends of the clevice bar, each of said chains being equipped with adjustable rubber bumpers for the towed vehicles protection, a large cast hook for easy accessible hook-up to a vehicle to be towed and a small hook at its opposed end to be used in those situations requiring a smaller hook, in which case the chain would go around a solid object and then the hook would be securely hooked to a link of the supporting chain.

Another object of this invention is to provide a towing unit as set forth above wherein the supporting chains are adjustably secured in a safe and easy manner by selectively slipping various links of the chains into the vertical notches provided in vertical square tubular steel members fixed to the opposed ends of the clevice bar.

BRIEF DESCRIPTION OF THE DRAWINGS

FIG. 3 is a vertical sectional view taken along the line 3—3 of FIG. 1.

DETAILED DESCRIPTION OF THE DRAWINGS

Figure 1:
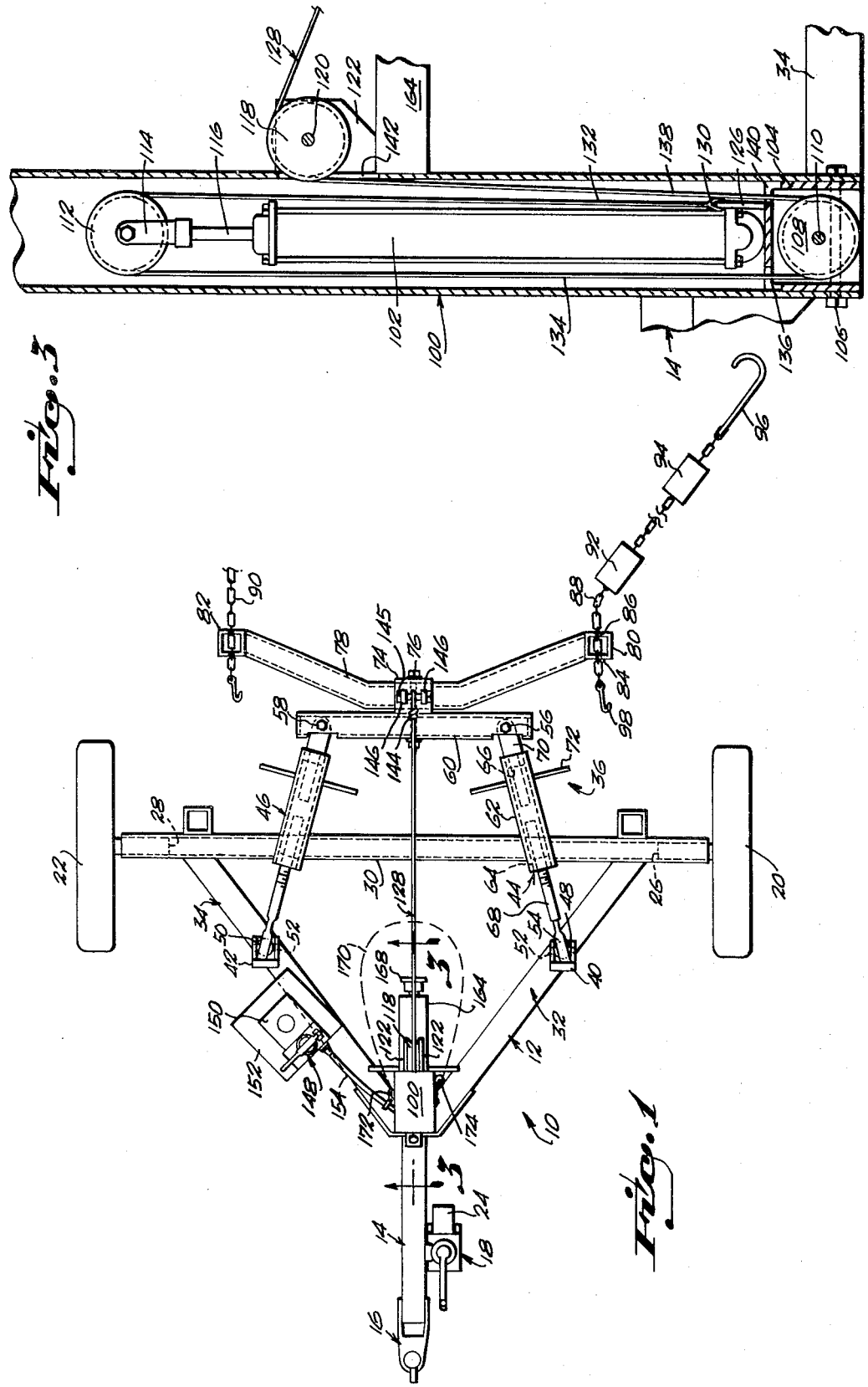
FIG. 1 is a top plan view of the tow trailer for vehicles of the present invention.
Figure 2:
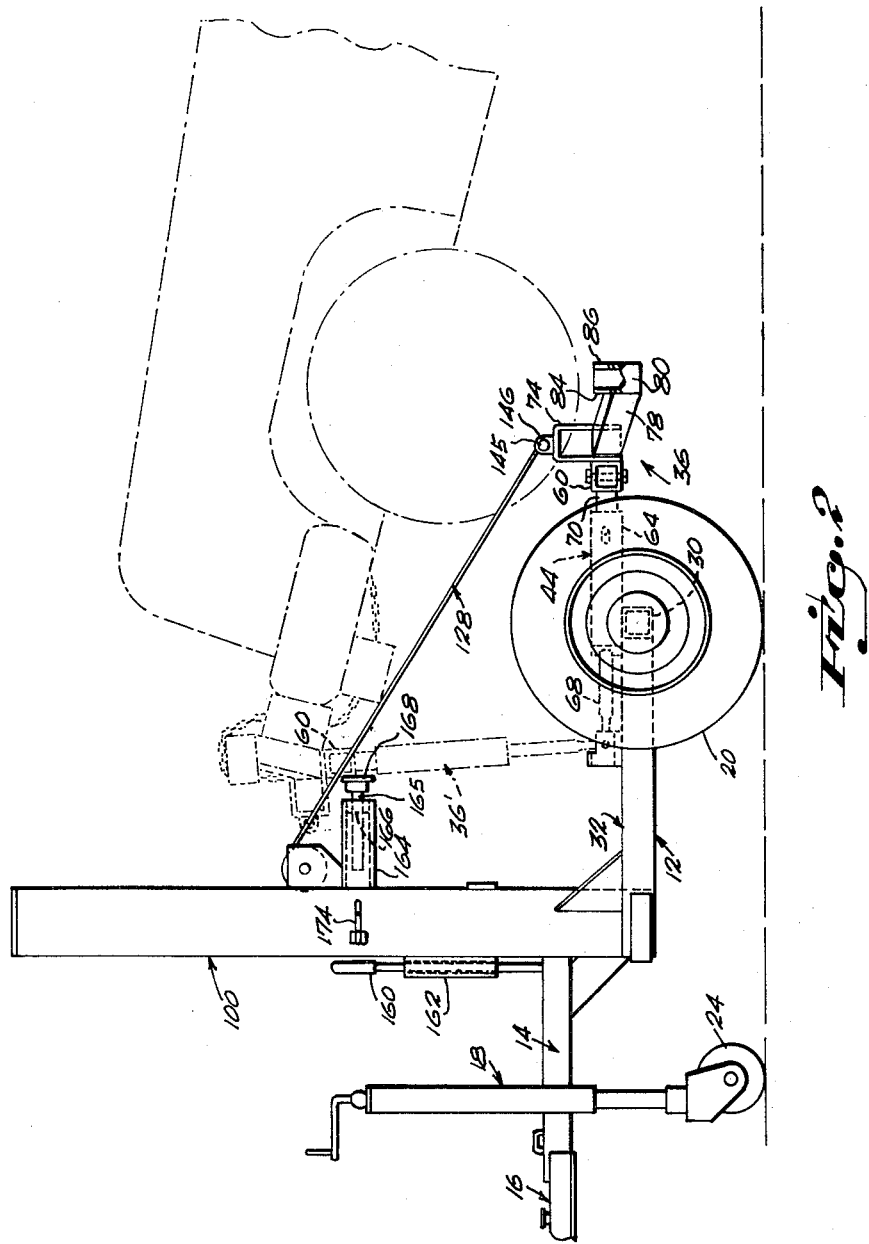
FIG. 2 is a side elevational view of the tow trailer of FIG. 1 illustrating the lift arm and clevice bar assembly in full lines in a down position and in dot-dash lines in an elevated or towing position.

Referring to the drawings in which like reference numerals designate like or similar parts throughout the several views and with particular reference to Figs. 1 and 2, the tow trailer of the present invention is indicated at 10 and is comprised generally of a horizontally disposed V frame 12 having a forwardly extending tongue 14, provided with a conventional trailer hitch 16 at its forward end for engagement with a ball on a tow vehicle (not shown). A trailer jack 18 of FIG. 3 is fixed to the tongue to cooperate with a pair of support wheels 20 and 22 to stabalize the tow trailer when it is detached from a tow vehicle.

The jack 18 preferably includes a caster wheel 24 to provide mobility to the device when detached from a tow vehicle and the road wheels 20 and 22 are rotatably mounted on respective spindles 26 and 28 fixed as by welding within the extended, oppossed ends of a tubular axle 30 fixed across the diverged ends of the V frame members 32 and 34.

A lift arm assembly, generally indicated at 36 is hingedly connected to the square tubular frame members 32 and 34. Journal members 40 and 42 are fixed as by welding to the top surfaces of the respective members 32 and 34 forwardly of the axle 30. A pair of lift arms 44 and 46 are pivotally attached to the journal members 40 and 42 by means of the ball pivots 48 and 50, each of which is provided with oppositely extending pins 52, engaged in appropriate apertures in the journal members 40 and 42.

A forward end 54 of each lift arm 44 and 46 is universally journalled on one of the balls 48 and 50 and the rearwardly extending ends of the arms 44 and 46 are pivotally attached at 56 and 58 to the respective end portions of a transverse bar 60 which straddles said rearwardly extending ends. Each lift arm 44 and 46 comprises a turnbuckle having a tubular central portion 62 having oppositely threaded opposed end nuts 64 and 66, fixed therein, in threaded engagement with similarly threaded forward and rearward end portions 68 and 70, provided with the respective pivotal connections between the journal members 40 and 42 and the transverse bar 60. Manipulating means in the form of outwardly projecting pins 72 are provided on each tubular portion 62.

A clevis 74 is centrally bolted, vertically against the rear surface of the transverse bar as at 76 and a generally transverse clevis 78 is centrally pivoted on the bolt 76 between the clevis arms. Fixed to the opposed ends, as by welding, are a pair of vertically extending steel, square tubular segments 80 and 82, each forward and rear top edge of which is vertically slotted at 84 and 86 to slidably receive a pair of chain links, illustrated in FIG. 1, of the hoist chains 88 and 90 to retain the respective chains in a fixed relation to the tubular segments 80 and 82.

Each chain 88 and 90 is provided with a pair of rubber bumpers 92 and 94 which are slidably adjustable along the length of the chain to protect a towed vehicle as illustrated in FIG. 1. A large cast hook 96 is fixed to one end of each chain 88 and 90 for hooked engagement with an appropriate portion of a vehicle and a small hook 98 is fixed to the opposed end of each chain which is obviously reversible. The small hook 98 is used when it is necessary to wrap the chain around a portion of the car, the hook 98 is then fixed in hooked engagement with a chain link to maintain the wrapped engagement.

A generally rectangular, tubular beam 100 is fixed to the apex of the V frame members 32 and 34 and extends upwardly therefrom and encloses a hydraulic cylinder 102 fixed therein. An inverted U shaped member 104 is bolted at 106 in the lower end of the beam 100 and a pulley 108 is rotatably journalled on a shaft 110 extending thereacross. A second pulley 112 is rotatably journalled in a clevis 114 fixed to the upwardly extending end of the cylinder piston rod 116 and a third pulley 118 is pivotally journalled at 120 between a pair of ears 122-122 fixed exteriorly to the rearward side of the beam 100.

Extending upwardly from the top wall 124 of the inverted U shaped member is a lug 126 to which one end of a cable 128 is attached as at 130. The cable 128 passes upwardly as at 132, over the second pulley 112, downwardly at 134 through a slot 136, around pulley 108, upwardly at 138 through a slot 140, outwardly through an elongated slot 142 in the rear wall of the beam 100, around the third pulley 118 and downwardly and rearwardly to a point of attachment 144 to a bolt 145 extending between a pair of upwardly extending ears 146-146 fixed as by welding to the top of the clevis 74. A manually operated hydraulic pump 148 and a hydraulic fluid storage tank 150 are fixed to a base plate 152 in which is in turn fixed to the frame member 34. A conduit 154 connects between the pump 148 and the bottom of the cylinder 102. When the pump is actuated, the piston rod 116 is extended upwardly causing the cable 128 to pivot the lift arm assembly 36 from the rearwardly extending, generally horizontal position, illustrated in full lines, to the upwardly and somewhat forwardly extended position, illustrated at 36' in dot-dash lines. With the double purchase system provided by the above described pulley arrangement, the amount of lift is twice the stroke length.

When one end of a vehicle is attached to the lift arm assembly by means of the chains 99 and 90 most of the weight of the towed vehicle is carried by the wheels of the tow trailer because the lift arm assembly is pivotally connected to the horizontal frame 12 forwardly of the axle 30 and the joint of suspension of the raised end of the vehicle, FIG. 1, is also forwardly of axle 30. However, sufficient weight is transferred to the tow vehicle to maintain good control.

An elongated handle extension 160 is provided for the hydraulic pump 148 and a vertically extending channel member 162 is welded to the forward face of the beam 100 to slidably receive the handle extension 160 for storage purposes when it is not in use.

Means are provided to adjust the weight distribution of the towed vehicle relative to the tow trailer and tow vehicle. To this end a rearwardly extending tubular member 164 is welded to the rear face of the vertical beam 100 and a bolt 165 is threaded through a nut 166 fixed in the member 164. An enlarged head 168 is provided on the bolt which is positioned to engage the cross bar 60 when the lift arm assembly is elevated. Therefore, it can be seen that in or out adjustment of the bolt 165 alters the stop position of the lift arm assembly 38 relative to the axis of the axle 30.

The clevis bar 78 is configurated to accomodate the relatively pointed, extended front ends provided on some new cars.

Safety chain means is indicated schematically by the broken line 170 in FIG. 1. One end of the chain is rigidly fixed at 172 to one side of the vertical beam 100 and the chain is adapted to extend around a portion of the lift arm assembly to a point of hooked attachment to a hook 174, rigidly fixed to the opposed side of the beam 100. The safety chain relieves the load on the hydraulic system during the towing operation. The hydraulic system is of the type which contains a valve which is operable to permit the hydraulic fluid to bleed back into the storage tank 150 to slowly permit the piston to return to the bottom of the cylinder 102 resulting in the lowering of the raised end of the car to the pavement.

Because of the pivotal connections provided for the clevis bar 60 and the lift arms 44 and 46, sufficient universal movement is provided to for the lift arm assembly 38 to accomodate the normal relative movement of a towed vehicle.

While a preferred embodiment of the tow trailer for vehicles of the present invention has been illustrated and described, it will be obvious to those skilled in the art that various modifications and structural changes can be made without departing from the true spirit of the invention as defined in the appended claims. For instance, appropriate mounting means may be provided for any type of lights or flashers that are required by law.

What is claimed is:

1. A tow trailer apparatus for lifting one end of a vehicle and towing same, comprising;
   A. A main, horizontallay disposed frame assembly including,
      1. a forwardly exgending tongue providing coupling means at its forward end for detachable, pivotal connection to a towing vehicle,
      2. a transverse axle, forming the rear end of said main frame, rotatably journaling a pair of support wheels at the opposed ends thereof;
   B. A lift arm assembly including,
      1. a transverse bar, normally positioned rearwardly of said axle,
      2. a generally transverse clevis bar, pivotally attached rearwardly of said transverse bar and providing, a means fixed to the opposed ends thereof for detachably, adjustably receiving chain means for connection to one end of a vehicle;
      3. a pair of lift arms, pivotally connecting between said main frame, forwardly of said axle, and the opposed end portions of said transverse bar;
   C. A vertical tubular beam, fixed to said main frame adjacent said tongue;
   D. A hydraulic cylinder disposed within said tubular beam providing an upwardly projecting piston rod, movable between up and down positions.
   E. A first pulley of a double purchase pulley system, rotatably carried by the upper end of said piston rod;
   F. A hoist cable, operable by said double purchase pulley system, when said piston rod is extended upwardly, to pivot said lift arm assembly from its normal horizontal, rearwardly extending position to an upwardly extending, forward towing position whereby the weight of a vehicle carried by said lift arm assembly is imposed on said main frame somewhat forwardly of said axle to proportionally distribute the weight between said trailer wheels and the towing vehicle;
   G. hydraulic actuating means to operate said piston rod between said up and down positions.

2. A tow trailer apparatus as defined in claim 1 where said double purchase pulley system includes said first pulley means, a second pulley means, rotatably journalled in said tubular beam, beneath said cylinder and a third pulley means rotatably journaled outwardly of the rear side of said beam, a substantial distance upwardly from the bottom end therof.

3. A tow trailer apparatus as defined in claim 2 wherein said hoist cable has a first end fixed within said tubular beam, adjacent the lower end thereof, said hoist cable then passing upwardly over said first pulley means, then downwardly around said second pulley means, then upwardly over said third pulley means and then rearwardly and downwardly to a point of removable attachment of the second cable end to said lift arm assembly.

4. A tow trailer apparatus as defined in claim 1 including an adjustable rearwarly extending stop means fixed to said vertical beam, a portion of said lift arm assembly being adapted to contact said stop means in said towing position.

5. A tow trailer apparatus as defined in claim 4 wherein said stop means is comprised of a tubular member fixed to said vertical beam and an elongated bolt, having an enlarged head portion, adjustably threaded inwardly and outwardly in internal thread means in said tubular member, said head portion being positioned to form the abutment for said lift arm assembly, thereby adjustably determining said proportional weight distribution.

6. A tow trailer apparatus as defined in claim 1 wherein said main frame includes a generally V shaped portion connecting between said tongue and axle.

7. A tow trailer apparatus as defined in claim 1 including a trailer jack, fixed to said tongue having a caster wheel on its lower end.

8. A tow trailer apparatus as defined in claim 1 wherein each of said lift arms comprises a turnbuckle.

9. A tow trailer apparatus as defined in claim 1 wherein said clevis bar is generally of a shallow V configuration.

10. A tow trailer apparatus as defined in claim 1 wherein said means fixed to the opposed ends is comprised of a relatively short length of vertically extending square tubing fixed to each end and having vertical notches in the upper forward and rearward edges thereof to slidably receive edgewise disposed chain links.

11. A tow trailer apparatus as defined in claim 10 wherein said chain means comprises a pair of chains of predetermined length, each of which includes an enlarged hook on one end and a small hook on its other end and is reversibly, adjustably engageable in said vertical notches.

12. A tow trailer apparatus as defined in claim 11 including a pair of bumpers, slidably adjustable along each of said chains, composed of a material such as hard rubber.

13. A tow trailer apparatus as defined in claim 1 wherein said hydraulic actuating means is comprised of a manually actuated hydraulic pump for pumping hydraulic fluid under pressure from a reservoir to the bottom end of said cylinder, through appropriate conduit means, to drive the piston therein and the piston rod upwardly to actuate said lift arm assembly.

14. A tow trailer apparatus as defined in claim 5 including safety chain means to hold said lift arm assembly against said enlarged head portion during the towing operation.

15. A tow trailer apparatus as defined in claim 14 wherein said safety chain means is comprised of a length of chain having one end fixed to said beam, the length thereof being extendable about a portion of said lift arm assembly, and a hook means fixed to said beam to slidably receive a chain link thereon to maintain said chain thereabout.

* * * * *